United States Patent [19]

Kincheloe

[11] Patent Number: 4,500,135

[45] Date of Patent: Feb. 19, 1985

[54] BABY CAR SEAT

[75] Inventor: Dan Kincheloe, San Clemente, Calif.

[73] Assignee: Kim-Kee Enterprises, San Clemente, Calif.

[21] Appl. No.: 486,704

[22] Filed: Apr. 20, 1983

[51] Int. Cl.³ .............................................. A47C 1/08
[52] U.S. Cl. .................................... 297/250; 297/216; 297/488; 280/751
[58] Field of Search ............... 297/250, 216, 464, 487, 297/488; 280/743, 751, 801

[56] References Cited

U.S. PATENT DOCUMENTS

| 3,713,695 | 1/1973 | Von Wimmersperg | 297/487 X |
| 3,865,433 | 2/1975 | Stafford | 297/488 |
| 4,039,225 | 8/1977 | Tomforde | 280/751 X |
| 4,436,341 | 3/1984 | Converse | 297/216 X |

Primary Examiner—Kenneth Downey
Attorney, Agent, or Firm—Blakely, Sokoloff, Taylor & Zafman

[57] ABSTRACT

A baby car seat and protector is disclosed which provides a comfortable car seat for a baby, complete with a conveniently located toy retaining tray-like area, which car seat automatically encloses the baby in a protective cocoon-like structure in the event of a crash to cushion the impact resulting therefrom and to protect the baby from flying glass and other debris. The car seat has a main member which defines a seat-like structure for receiving the baby in the sitting position and supporting the back thereof, with the seat-like structure having a top region and sides which extend forward somewhat around the baby to provide side protection thereto. A second, tray-like member is disposed in front of the baby to define a region for conveniently holding toys and the like. The tray-like member extends to the baby's chest and abdomen, providing a padded tunnel-like region for passage of an automobile seat belt therethrough. The tray-like member is fastened to the main seat structure through a bellows-like structure so that in the event of an impact, the tray-like structure will rotate upward to engage the sides and top of the seat structure to provide a protective enclosure for the baby. In the event of a collision from behind, the tray-like structure will swing upward under its own weight, whereas in the event of a head-on collision, other means are provided to force the tray-like structure to the protective position. While the car seat may be fabricated by various techniques, such as utilizing light weight foams with a protective outer surface, an inflatable structure is preferred as providing ideal cushioning in use and ready storage when not in use.

11 Claims, 5 Drawing Figures

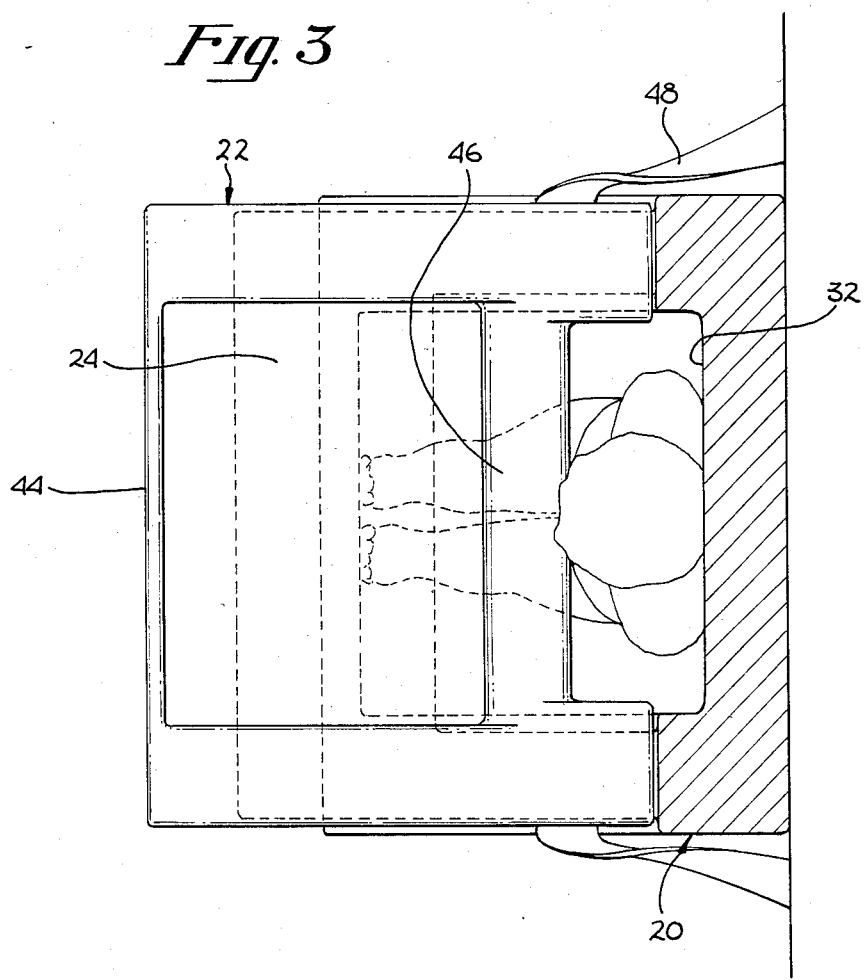
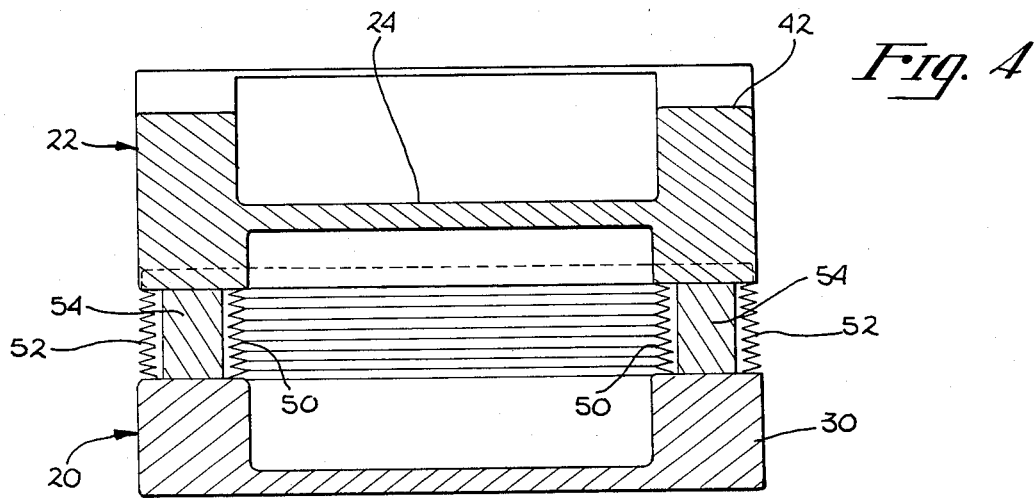

BABY CAR SEAT

BACKGROUND OF THE INVENTION

1. Field of the Invention

The present invention relates to the field of baby car seats.

2. Prior Art

In recent years, various aspects of automotive design have been dictated and/or changed for purposes of inherent safety in the automotive design. In particular, it has been recognized that the survivability and more preferably the survivability without serious injury of particular types of crashes can depend very strongly on various aspects of the automobile design, such as padded dashboards, seat belts, shoulder straps, head supports, collapsible steering columns, etc. For the same reason, the design of baby car seats has also attracted considerable attention, as babies are particularly susceptible to serious or fatal injury, even in accidents which adults would readily survive without difficulty.

Obviously if a baby is unrestrained in the event of a crash from the front or side, the baby's body will freely move until it strikes the dashboard or door region, usually at such a low elevation that switches, door handles and the like provide a serious threat to the baby's safety. Also, of course, the baby's body position will be quite random so that spinal or other injuries may be incurred even if the baby strikes a relatively smooth or padded region. Consequently, it is very highly desirable to have some form of baby car seat to provide the desired emergency restraint.

Various types of baby car seats which are retained by the use of seat belts are known in the prior art. Such car seats may take any of various forms, though usually include some form of rigid structure for the purpose. In some instances, the seat belt is used to retain the car seat, with the car seat in turn hopefully retaining the baby, while in other instances the seat belt is disposed directly to restrain the baby in the event of a crash. In either instance, there is a meaningful possibility that the baby will not be restrained as desired, or that the baby will be injured by the seat belt or other restraining device. By way of example, a seat belt directly restraining a baby may be too high, too low or too loose at the moment of impact, allowing the baby's body to slip out of the seat belt, or alternatively, to engage the baby's body at an inopportune location to cause internal injury thereto. Obviously, if only the car seat is retained by the seat belt, the ultimate protection and restraint of the baby is even more suspect.

In addition to the question of restraint in the event of a crash is the possibility of injury due to flying glass and other debris. Many car seats do not provide meaningful protection to the baby against possible injury from such flying debris, as to do so would unduly obstruct the baby's vision or an adult's ability to watch, feed or humor the baby. In any event, prior art baby car seats generally represent a fixed compromise between obstruction and protection, that compromise varying with the various car seat designs now available.

BRIEF SUMMARY OF THE INVENTION

A baby car seat and protector is disclosed which provides a comfortable car seat for a baby, complete with a conveniently located toy retaining tray-like area, which car seat automatically encloses the baby in a protective cocoon-like structure in the event of a crash to cushion the impact resulting therefrom and to protect the baby from flying glass and other debris. The car seat has a main member which defines a seat-like structure for receiving the baby in the sitting position and supporting the back thereof, with the seat-like structure having a top region and sides which extend forward somewhat around the baby to provide side protection thereto. A second, tray-like member is disposed in front of the baby to define a region for conveniently holding toys and the like. The tray-like member extends to the baby's chest and abdomen, providing a padded tunnel-like region for passage of an automobile seat belt therethrough. The tray-like member is fastened to the main seat structure through a bellows-like structure so that in the event of an impact, the tray-like structure will rotate upward to engage the sides and top of the seat structure to provide a protective enclosure for the baby. In the event of a collision from behind, the tray-like structure will swing upward under its own weight, whereas in the event of a head-on collision, other means are provided to force the tray-like structure to the protective position. While the car seat may be fabricated by various techniques, such as utilizing light weight foams with a protective outer surface, an inflatable structure is preferred as providing ideal cushioning in use and ready storage when not in use.

BRIEF DESCRIPTION OF THE DRAWINGS

FIG. 3 is a view taken along line 3—3 of FIG. 2.

FIG. 4 is a view taken along line 4—4 of FIG. 2.

DETAILED DESCRIPTION OF THE INVENTION

Figure 1:
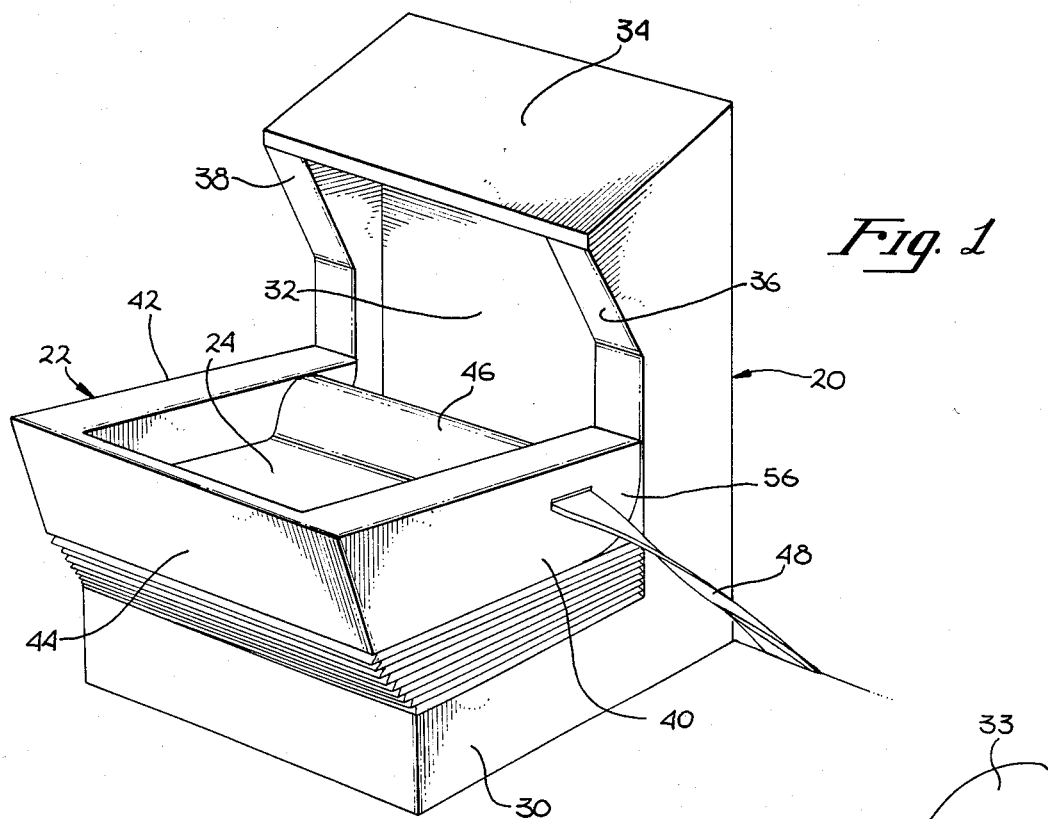
FIG. 1 is a perspective view of the baby car seat and protector of the present invention.
Figure 2:
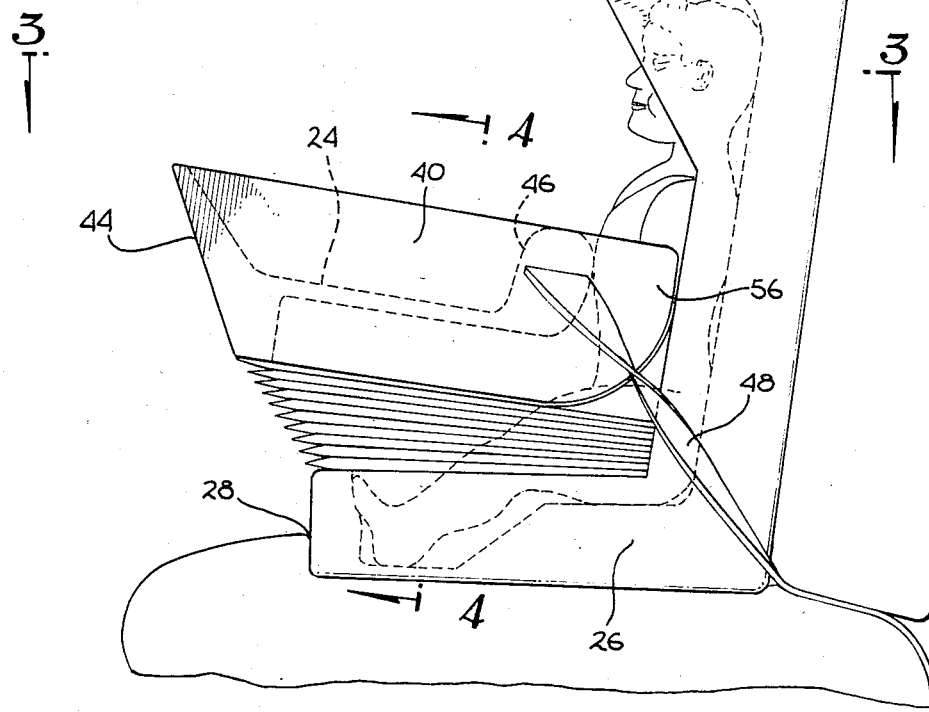
FIG. 2 is a side view of the car seat of FIG. 1.

First referring to FIG. 1, a prospective view of the car seat of the present invention may be seen. As shown, the car seat is comprised of two major elements, specifically a main member 20 which, among other things, defines the seat for the baby, and a tray-like member 22 which, among other things, defines a tray-like receptacle 24 for retaining the baby's playthings, bottle, etc. The seat member 20 may also be seen in FIG. 2. It is characterized by a seat-like region 26 with a well-like region 28 forward thereof for receiving the baby's feet, the well-like region 28, of course, being disposed inward from the sides of the seat member 20 so that the sides, such as side 30, enclose the sides of the well-like region 28. Extending upward from the seat region 26 is a substantially flat back region 32 which in turn will lie flat against a car seat 34, with the back 32 of the car seat extending upward above the baby's head and then forward to provide a roof-like extension 34 over the baby's head. In general, the sides of the seat member 20 also extend forward to provide side regions 36 and 38 which will protect the baby in the event of a side crash.

The tray-like member 22, in addition to defining the tray region 24, is characterized by a generally U-shaped structure comprised of sides 40 and 42 and front panel 44. The sides 40 and 42 and front panel 44 of course define the side and front edges of the tray 24, the back edge thereof being defined by a padded region 46 having an opening therethrough for receipt of the automobile seat belt 48. As may be seen, the seat belt is wound slightly so that under tension the seat belt will tend to unwind, thereby providing one of the means for causing the tray-like member 22 to rotate upward to enclose the baby.

Now referring to FIGS. 3 and 4, other details of the invention may be seen. FIG. 3 is a view taken along line 3—3 of FIG. 2, with FIG. 4 being a view taken along line 4—4 of FIG. 2. It may be seen that the tray-like member 22, as well as the seat member 20, are generally rectangular configurations and proportioned so as to comfortably receive babies of various sizes, the seat belt 48 being retained at the proper elevation immediately in front of the baby without pulling constantly on the baby's stomach by the self-supporting, but flexible padded region 46. In that regard, the padded region 46 is preferably fabricated from an energy absorbing self-supporting but flexible flat tubular member through which the seat belt passes, such as a urethane or polyethylene member with additional padding therearound, such as a foam or cloth mat finished with a suitable dirt and moisture resistant covering. It may be seen that the general shape of the seat belt 48 is viewed from the top (see FIG. 3) is normally a U-shaped. Thus in the event of a head-on crash wherein the baby will tend to be thrown forward, the seat belt 48 will not immediately snap tight against the baby with the potential of injury thereto, but rather will more gently deflect to more of a V-shape against the energy absorbing bending of padded member 46, whereby the baby's energy is absorbed over a much greater, but still restrained movement, minimizing the forces on the baby's body due to the seat belt while assuring that whatever restraining force is ultimately required will be available, depending upon the severity of the crash.

Now referring to FIG. 4, details of the bellows-like connection between the tray-like member 22 and the seat member 20 may be seen. Preferably, the bellows-like connection is comprised of an inner member 50 and a second outer member 52, somewhat separated from each other and in the normal position shown in FIGS. 1 and 2 entrapping some air therebetween. To hold the members in the position shown, blocks of flexible foam or alternatively a thin C-shaped foam member 54 may be used. This assures that the proper positioning of the two main elements with respect to each other and the entrapment of an adequate quantity of air therebetween, the function of which will be subsequently described.

Figure 5:
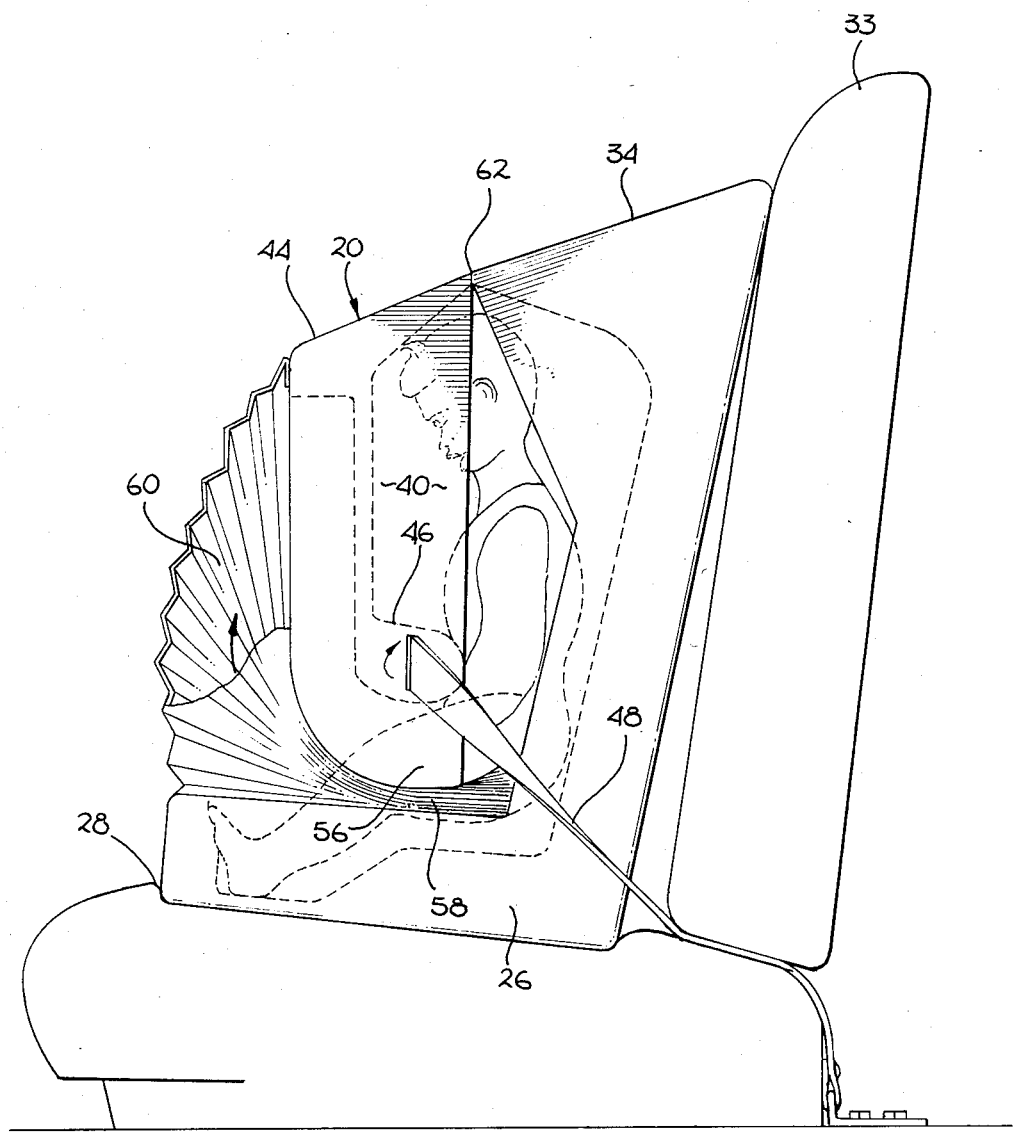
FIG. 5 is a side view of the car seat of FIG. 1, illustrating the operation of the invention in the event of a crash.

Now referring to FIG. 5, the operation of the invention in the event of a head-on crash may be seen. As previously mentioned, the seat belt 48 is passed through the padded tubular member 46 in such a way that tension in the seat belt tends to make the belt unwind, thereby providing a torque on the tray-like member 22 to encourage it upward as shown in the figure. In addition, while the portion of the seat belt which engages the baby's stomach and lower chest region remains at that approximate elevation, the deflection of the seat belt from the U-shaped outline described with respect to FIG. 3 to a more V-shaped outline results in the corners 56 (see FIGS. 1 and 2) being pulled backward and particularly downward to force the air out of the bellows-like structure in region 58, thereby further inflating region 60 to pneumatically force the tray-like member 20 upward to the position shown and simultaneously acting as a seat belt energy absorber. In that regard as shall subsequently be described, the tray-like member 20 (as is the entire car seat) is very light so that the inertial forces thereof may readily be overcome by the untwisting of the seat belt, the redistribution of the entrapped air and particularly by both of these means acting in parallel. Further, it will be noted that the front 44 of the tray-like member 22 (see FIG. 1) is purposely given a sloping contour so that it will have a natural tendency of riding up and over any obstruction in front of it, such as a dashboard in the event the seat belt is inadvertently left unattached, or in the case of a particularly severe head-on crash. If desired, a Velcro or other fastener may be coupled to the tray and seat members, such as in region 62 of FIG. 5, so that the baby will be latched in a protective, fire retardant cocoon until help arrives.

The structure and method of manufacture of the present invention may vary as desired. By way of example, various types of foams, such as urethane foam, may readily be used to mold the two major members making up the car seat of the present invention. In order to provide the desired protection against piercing type objects and to better cushion the impact, it is preferable to have a tough, impervious and fire retardant fabric or other covering on the foam, as that will grossly inhibit the piercing action of most objects and will result in the entrapment of air between the inner and outer layers to provide an air bag-like effect in the event of a collision, separate and apart from the cushioning provided by the foam itself. In that regard, the covering could well be a very tightly woven nylon or other material sewn into the desired shape and provided with a zipper opening so that molded foam inserts preserve the desired shape in use. Such a sailcloth-like material would be relatively impervious to air, at least for the time duration of an impact and would be highly resistant to piercing, though readily removed for washing, if desired.

The preferred embodiment however, except for the padded member 46, utilizes an inflatable structure fabricated from a tightly woven fabric of high strength fiber or filament. By way of example, a sailcloth-like material of tightly woven nylon filament may be sewn into the desired shape, with the entire structure being made airtight by rubberizing or coating with a flexible urethane, to name but two techniques which may be used. Obviously in that regard, the present invention has been illustrated in the drawings as a strictly rectangular structure for clarity and ease of illustration, though an inflatable structure will tend to be rounded in various ways as a result of the inflation pressure and by way of design to keep reasonable tension in the fabric in all places. In certain areas, such as the back of the seat member 22 where relatively large flat areas are indicated in the drawings, an inflatable structure will tend to appear as a tufted structure as a result of either sewing the back and front fabric coverings together to form parallel tubes or some other pattern, or as a result of sewing the front and back to intermediate panels which act as baffle panels in the event of a crash. The inflatable structure has the advantage that the size and proportions of the baby's seat when inflated may be chosen by design substantially without restriction, as storage of the deflated seat will take up little room in any event and need not be specifically allowed for as a design constraint or compromise. Obviously even some of the newer, particularly high-strength filaments may be used as a woven cloth for the present invention such, by way of example, Kevlar.

There has been described herein a new and unique baby car seat and protective device which automatically encloses the baby within a protective cocoon-like structure in the event of a crash and cushions the baby's body over a substantial area of the body and over a significant, though still restricted motion so as to restrain, protect and cushion the baby in the event of a crash. Obviously, while the preferred embodiment has been disclosed and described herein and various methods of fabrication for the present invention have been described, it will be understood by those skilled in the art that various changes in form and detail may be made therein without departing from the spirit and scope of the invention.

What is claimed is:

1. A baby car seat, comprising:
   seat-like means for resting on a seat, said seat-like means being a means for maintaining a baby in a sitting position and for supporting the baby's back,
   enclosure means attached to said seat-like means and rotatable with respect thereto between first and second positions, said enclosure means in said first position extending over and forward of the baby's abdomen so as to not substantially obstruct the baby's play and vision, said enclosure means in said second position extending upward in front of the baby's chest and head and together with said seat-like means, substantially enclosing the baby's body and head in a protective enclosure,
   means for coupling said baby car seat to a car seat belt, and
   means for rotating said enclosure means from said first position toward said second position in response to an inertial force,
   whereby, in response to the force created by a collision, said rotating means will rotate said enclosure means toward said seat-like means to provide a protective enclosure for the baby in case of an accident.

2. The baby car seat of claim 1, wherein said seat-like means comprises side means extending around the baby to provide side protection to the baby in case of an accident.

3. The baby car seat of claim 1, wherein said seat-like means further comprises roof means extending over the baby's head for providing a roof-like extension over the baby's head whereby in the event of a collision, said enclosure means will be rotated upward by said rotating means to engage said roof-like means to provide a protective enclosure for the baby.

4. The baby car seat of claim 1, wherein said rotating means comprises a bellows-like structure whereby, in the event of a collision, air redistributed in said bellows-like structure from the force of the collision will cause the enclosure means to rotate upward to engage said seat-like means thereby providing a protective enclosure for the baby.

5. The baby car seat of claim 1, wherein said enclosure means comprises a tray-like member for holding toys and the like.

6. The baby car seat of claim 1, wherein said means for coupling to the main car seat belt is a padded tunnel-like region in said enclosure means forward of the baby's abdomen for passage of a twisted car seat belt therethrough to hold the baby car seat to the main car seat, and wherein said rotating means comprises the twisted car seat belt.

7. The baby car seat of claim 1, wherein said baby car seat is an inflatable structure.

8. The baby car seat of claim 1, wherein said rotating means is a bellows-like connection between said enclosure means and said seat-like means having an inner member and an outer member separated from each other such that air is trapped therebetween, whereby in the event of an accident, the car seat belt provides a torque on said enclosure means to encourage said enclosure means to rotate toward said second position and also provides a force to redistribute air in said bellows-like connection to further encourage said enclosure means toward said second position.

9. A baby car seat, comprising:
   seat-like means for resting on a seat, said seat-like means being a means for maintaining a baby in a sitting position and for supporting the baby's back,
   enclosure means attached to said seat-like means and rotatable with respect thereto between first and second positions, said enclosure means in said first position extending over and forward of the baby's abdomen so as to not substantially abstruct the baby's play and vision, said enclosure means in said second position extending upward in front of the baby's chest and head and together with said seat-like means, substantially enclosing the baby's body and head in a protective enclosure, said enclosure means having a padded tunnel-like region for passage of a twisted car seat belt therethrough to hold the baby car seat to the main car seat,
   means for coupling said baby car seat to a car seat belt, and
   means for rotating said enclosure means from said first position toward said second position in response to an inertial force,
   whereby, in response to the force created by a collision, said rotating means will rotate said enclosure means toward said seat-like means to provide a protective enclosure for the baby in case of an accident.

10. The baby car seat of claim 9, wherein said rotating means comprises a bellows-like structure whereby, in the event of a collision, air redistributed in said bellows-like structure from the force of the collision will cause the enclosure means to rotate upward to engage said seat-like means thereby providing a protective enclosure for the baby.

11. The baby car seat of claim 9, wherein said rotating means is a bellows-like connection between said enclosure means and said seat-like means having an inner member and an outer member separated from each other such that air is trapped therebetween, whereby in the event of an accident, the car seat belt provides a torque on said enclosure means to encourage enclosure means to rotate toward said second position and also provides a force to redistribute air in said bellows-like connection to further encourage said enclosure means toward said second position.

* * * * *